May 16, 1950    J. H. BLANKENBUEHLER    2,508,140
WELDING GENERATOR
Filed Dec. 29, 1945
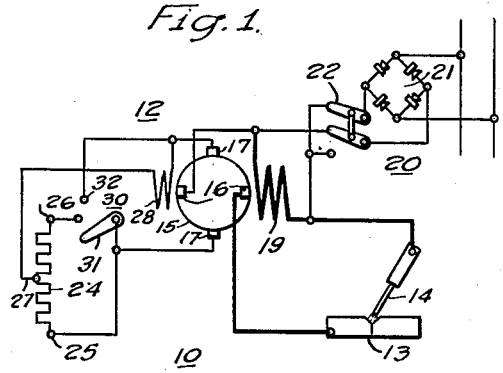
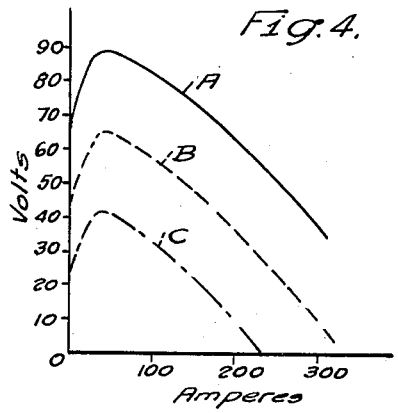
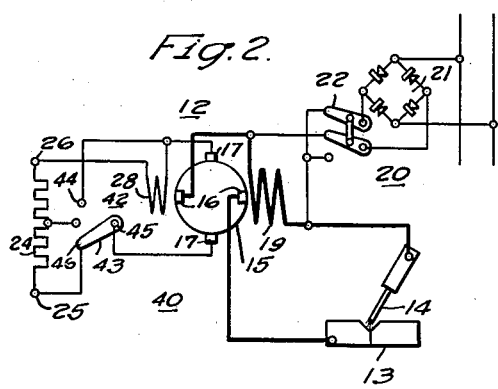
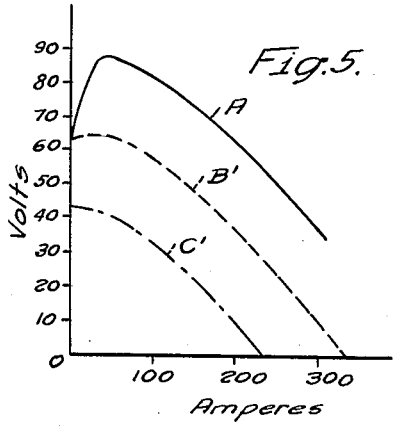
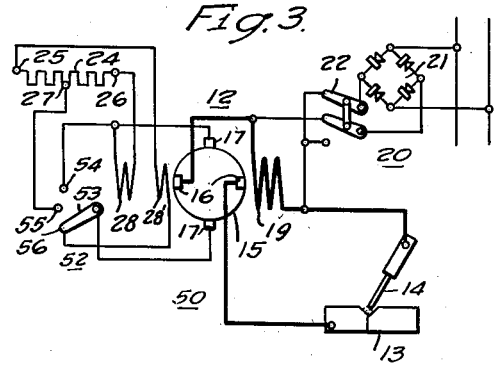
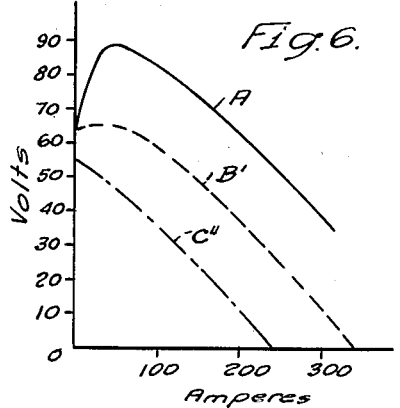
WITNESSES:
INVENTOR
John H. Blankenbuehler.
BY
ATTORNEY Patented May 16, 1950

2,508,140

UNITED STATES PATENT OFFICE 2,508,140

WELDING GENERATOR

John H. Blankenbuehler, Murrysville, Pa., assignor to Westinghouse Electric Corporation, East Pittsburgh, Pa., a corporation of Pennsylvania Application December 29, 1945, Serial No. 638,358

6 Claims. (Cl. 322—92)

My invention relates, generally, to generators and it has reference, in particular, to control systems for arc welding generator of the cross-field type such as may be used for arc welding and the like.

Generally stated, it is an object of my invention to provide an arc welding generator which is simple and inexpensive to manufacture and which is easy to operate.

More specifically, it is an object of my invention to provide for improving the operating characteristics of generators of the cross-field type.

Another object of my invention is to provide for varying the output current of arc welding generators of the cross-field type without adversely affecting the open circuit voltage of the generator.

Yet another object of my invention is to provide for shifting the position of the volt-ampere curve of generators of the cross-field type without materially reducing the open circuit voltage.

It is also an object of my invention to provide for using an auxiliary field winding for increasing the open circuit voltage of a generator of the cross-field type when the impedance of the auxiliary brush circuit is increased to provide a lower value of arc welding current.

Other objects will, in part, be obvious and will, in part, be explained hereinafter.

In practicing my invention in one of its forms, a generator of the cross-field type is provided with resistance means for varying the impedance of the auxiliary brush circuit for the purpose of providing different values of current in an arc welding circuit. An auxiliary field winding is provided on one of the field poles and a control switch is used to simultaneously connect the auxiliary field winding and the resistance means in the auxiliary brush circuit of the generator in series and series parallel relations. The characteristic volt-ampere curve of the generator may thus be altered in different degrees to vary the value of the welding current without reducing the open circuit voltage below a value at which an arc may be easily struck.

For a more complete understanding of the nature and scope of my invention, reference may be made to the following detailed description which may be studied in connection with the accompanying drawing, in which:

Figure 1 is a diagrammatic view of an arc welding system embodying the invention in one of its forms;

Fig. 2 is a diagrammatic view of an arc welding system embodying the invention in another of its forms;

Fig. 3 is a diagrammatic view of an arc welding system embodying the invention in a different form;

Fig. 4 shows a plurality of volt-ampere or load characteristic curves illustrating the prior method of varying the output characteristics by varying the impedance of the auxiliary brush circuit;

Fig. 5 shows a plurality of volt-ampere or load characteristic curves illustrating the method of varying the output by means of the system shown in Figs. 1 and 2; and Fig. 6 shows a plurality of volt-ampere or load characteristic curves illustrating the method of varying the output characteristic of the generator in the system of Fig. 3.

The present invention is an improvement over the invention disclosed in Patent No. 2,342,720, which issued to me on February 9, 1944. While the generator shown in the above-mentioned patent is illustrated as having both a sliding magnetic shunt as well as switch means for controlling the connections of a control resistor in the auxiliary brush circuit for varying the output characteristics of the generator, the generator in the present invention is shown, for purposes of simplification, as having only the switch means and control resistor for varying the output characteristics. It will be understood, however, that the present invention may be used with either method of current control or with both methods, as well as with other systems of control wherein variations of the ouput characteristics normally result in reduced open circuit voltage.

Referring to Fig. 1, the reference numeral 10 may denote, generally, an arc welding system wherein a generator 12 of the cross-field type is disposed to provide welding current to work 13 and an arc welding electrode 14.

The generator 12 may comprise an armature 15 having pairs of main brushes 16 and auxiliary brushes 17 positioned along axes which are substantially ninety electrical degrees apart. The main brushes 16 may be positioned along the longitudinal axis of a main field winding 19 which may be connected in circuit relation with the main brushes, work 13 and electrode 14. Control means 20 comprising a rectifier circuit 21 and a reversing switch 22 may be provided in connection with the main field winding 19 for supplying a unidirectional current thereto for determining the polarity of the work 13 and electrode 14.

In order to provide for varying the output characteristics of the generator 12, a control resistor 24 may be provided having end terminals 25 and 26 with an intermediate tap 27 positioned therebetween. Instead of merely connecting the control resistor 24 in series circuit relation with the auxiliary brushes 17, which would result in a family of volt ampere curves A, B and C such as shown in Fig. 4 when the auxiliary brushes 17 are short-circuited and when one or two sections of the control resistor are connected in series circuit relation with the auxiliary brushes, provision may be made for connecting an auxiliary field winding 28 between the auxiliary brushes 17 in conjunction with the control resistor 24.

The auxiliary field winding 28 may be positioned on either of the field poles of the generator and may be so connected as to be cumulative with respect to the main field winding 19. A multi-position switch 30 may be provided having a movable arm 31 which may be connected to the terminal 25 of the control resistor 24 and to the lower one of the auxiliary brushes 17. The auxiliary field winding 28 may be connected between the upper one of the auxiliary brushes 17 and the intermediate tap 27 of the control resistor. The movable arm 31 of the switch 30 may be connected to either the terminal 26 of the control resistor or a stationary contact 32 which may be connected to the junction of the auxiliary field winding 28 with the upper one of the auxiliary brushes 17.

With the movable arm 31 engaging the stationary contact 32, the auxiliary brushes 17 are short-circuited and the auxiliary field winding 28 and control resistor 24 are disconnected from the circuit. As shown in Fig. 5, the volt ampere curve of the generator 12 may be represented by the curve A, which is identical with the curve A shown in Fig. 4, since in both instances the auxiliary brushes of the generators are short-circuited.

When the movable arm is connected to the terminal 26, the two sections of the control resistor on either side of the intermediate tap 27 are connected in parallel circuit relation and in series circuit relation with the auxiliary field winding 28 between the auxiliary brushes 17. Accordingly, the output characteristic of the generator under these conditions may be represented by the curve B' of Fig. 5.

Since the field winding 28 is cumulative with respect to the main field winding 19, the open circuit voltage of the generator is increased from approximately 42 to 63 volts so that it is substantially identical with the open circuit voltage of the curve A. Because the magnetic circuit of generators of the cross-field type is substantially saturated throughout the entire operating range, the cumulative effect of the auxiliary field winding 28 will not be noticed under load conditions. Accordingly, the major portion of the curve B' is substantially identical with the principal portion of the curve B.

When the movable arm 31 is moved to the position shown, the auxiliary field winding 28 is connected in series circuit relation with the auxiliary brushes 17 and the portion of the control resistor 24 between the intermediate tap 27 and the terminal 25. Since the impedance of the circuit is increased over that previously described in connection with the characteristic curve B', the output characteristic may be represented by the curve C'. Since the increase of resistance in the auxiliary brush circuit produces the current therein, the effect of the auxiliary winding 28 is not as noticeable as in the case of the curve B'. Accordingly, the open circuit voltage may be reduced somewhat to a value of approximately 43 volts. Throughout a major portion of the curve C', the curve coincides with the curve C of Fig. 4. Because of the auxiliary field winding 28, however, the open circuit voltage is increased from a value of approximately 22 volts to a value of approximately 43 volts. This increase greatly improves the stability of the arc and greatly facilitates the striking of the arc.

Referring to Fig. 2, the reference numeral 40 may denote, generally, an arc welding system wherein a generator 12 of the cross-field type having main brushes 16 and auxiliary brushes 17 is connected for supplying welding current to an arc welding circuit including work 13 and an electrode 14. The generator may be provided as hereinbefore with the main field winding 19 and polarity control means 20 for controlling the terminal polarity of the generator.

In this embodiment of the invention, the auxiliary field winding 28 and the control resistor 24 may likewise be connected in circuit relation with the auxiliary brushes 17 by means of a multi-position switch 42. The switch may comprise a movable contact arm 43 connected to the lower one of the auxiliary brushes for selectively engaging stationary contact members 44, 45 and 46, which may be connected to the upper one of the auxiliary brushes 17, to the intermediate tap 27, and to the terminal 25 of the control resistor 24 respectively. The auxiliary field winding 28 may be connected between the upper one of the auxiliary brushes 17 and the terminal 26 of the control resistor.

With the movable arm 43 engaging the stationary contact member 44, the auxiliary brushes 17 will be short-circuited and the output characteristic of the generator will conform to the curve A of Fig. 5. With the contact arm 43 engaging the stationary contact 45, one section of the control resistor 44 is connected in the auxiliary brush circuit in series circuit relation with the auxiliary winding 28 so that the output characteristic of the generator conforms to the curve B' of Fig. 5. With the movable contact arm 43 in the position shown, both sections of the control resistor are connected in series circuit relation with the auxiliary field winding 28 and the auxiliary brushes 17 so that the output characteristic of the generator conforms generally to the curve C' of Fig. 5.

Referring to Fig. 3, the reference numeral 50 denotes, generally, an arc welding system wherein an arc welding generator 12 of the cross-field type having main brushes 16 and auxiliary brushes 17 is provided with a main field winding 19 connected in series circuit relation with the main brushes for providing welding current to an arc welding circuit including a work piece 13 and electrode 14. Polarity control means 20 may be provided in conjunction with the main field winding 19 for selectively determining the terminal polarity of the work piece 13 and electrode 14.

A control resistor 24 may be provided, as hereinbefore, for changing the volt ampere or characteristic curves of the generator to provide different values of welding current. Instead of utilizing a single auxiliary field winding 28 in conjunction with the control resistor 24, auxiliary field windings 28 and 28' may be provided. Both of these windings may be arranged for connection in cumulative relation with the main field winding 19 in the auxiliary brush circuit by means of a control switch 52 having a movable contact arm 53 for selectively engaging a plurality of stationary contact members 54, 55 and 56.

With the movable contact arm 53 engaging the stationary contact member 54, the auxiliary brushes 17 are short-circuited and the output characteristic of the generator may be represented by the curve A of Fig. 6, which is identical with the curve A of Figs. 4 and 5.

When the movable contact arm 53 engages the stationary contact member 55, the auxiliary field winding 28 is connected in series circuit relation with the auxiliary brushes 17 and the section of the control resistor 24 between the terminal 26 and the intermediate tap 27. Accordingly, the output characteristic of the generator may be represented by the curve B' of Fig. 6, which is identical with the curve B' of Fig. 5.

The effect of the auxiliary field winding in raising the open circuit voltage is substantially the same as that for the systems of Figs. 1 and 2. However, with the movable contact arm 53 engaging the stationary contact member 56, both the auxiliary field windings 28 and 28' are now connected in series circuit relation with the auxiliary brushes 17 and both sections of the control resistor 24.

Accordingly, the output characteristic of the generator represented by the curve C'', shown in Fig. 6, illustrates the effect of the auxiliary field winding 28 in further boosting the open circuit voltage. The open circuit voltage is now approximately 55 volts instead of the 43 volts shown in Fig. 5 and the 22 volts of the uncompensated generator shown in Fig. 4.

From the above description and the accompanying drawing, it will be apparent that I have provided in a simple and effective manner for improving the operating characteristics of generators of the cross-field type. Instead of varying the current output and reducing the open circuit voltage each time the output current is reduced as has been the case with the systems of the prior art, I have provided for so controlling the output characteristics of the generators as to permit decreasing the value of welding current without appreciably reducing the open circuit voltage.

Since it has been determined by experience that the open circuit voltage of a welding generator had a definite effect on the ease of striking the arc, it is extremely important to insure maintaining the open circuit voltage above the predetermined value, regardless of the current setting for which the generator may be adjusted. With an open circuit voltage of 60 volts or thereabouts, little difficulty is ever encountered in striking an arc but when the open circuit voltage is reduced below approximately 40 volts, difficulty is frequently encountered in striking an arc, particularly if the work does not have a clean or oxidized surface.

Accordingly, by providing for maintaining substantially the full open voltage of the generator when adjusted for the maximum current output, I have provided for greatly improving the ease of striking the arc. This greatly reduces the time consumed in arc welding operations and further reduces the possibility of damage to the work through marring the surface by reason of repeated attempts to strike an arc.

Since certain changes may be made in the above-described construction and different embodiments of the invention may be made without departing from the spirit or scope thereof, it is intended that all the matter contained in the above description and shown in the accompanying drawing shall be considered as illustrative and not in a limiting sense.

I claim as my invention:

1. For use with a generator of the cross-field type having main and auxiliary brushes, a resistor having end terminals and an intermediate tap, an auxiliary field winding, circuit means connecting the auxiliary field winding in series circuit relation with the auxiliary brushes and the intermediate tap and one end terminal of the resistor, and additional circuit means including a multi-position switch operable to one position to shunt the resistor and field winding and operable to another position to connect the two end terminals of the resistor to one of the auxiliary brushes.

2. Control means for an arc welding generator of the cross-field type having an armature with main and auxiliary brushes and a main field winding having its axis along the axis of the main brushes comprising, a control resistor having a pair of end terminals and an intermediate tap, an auxiliary field winding connected between one terminal of the resistor and one of the auxiliary brushes cumulatively relative to the main field winding, and a multiposition switch having a movable arm connected to the other of the auxiliary brushes, said switch being operable to different positions to provide a circuit to the other terminal of the resistor, to the intermediate tap, or to the said one of the auxiliary brushes.

3. In a generator of the cross-field type, an armature having main and auxiliary brushes positioned along axes ninety electrical degrees apart, a main field winding having its longitudinal axis substantially along the axis of the main brushes, said winding being connected in series circuit relation with the main brushes, an auxiliary field winding having its longitudinal axis substantially along the axis of the main field winding, a control resistor, and circuit means connecting the auxiliary field winding and the control resistor in circuit relation with the auxiliary brushes to lower the current output of the generator without substantially reducing the open circuit voltage of the generator.

4. A generator of the cross-field type comprising, an armature having main and auxiliary brushes, a main field winding connected in circuit with the main brushes, resistance means comprising a plurality of sections, an auxiliary field winding having a like plurality of sections, and circuit means including a multiposition switch operable to different positions to connect one or more of said resistance sections and winding sections in circuit with the auxiliary brushes, whereby the output current of the main brushes is reduced in different amounts without appreciably reducing the open circuit voltage of the main brushes.

5. In a generator of the cross-field type having an armature with main and auxiliary brushes and a main field winding connected in series circuit relation with the main brushes disposed along the axis of the main brushes, a resistor, an auxiliary field winding disposed axially of the main field winding, and switch means selectively operable to connect the resistor in circuit with the auxiliary brushes to vary the current output and simultaneously connect the auxiliary field winding in circuit with the auxiliary brushes in cumulative relation with the main field winding to prevent the resistor from materially reducing the open circuit voltage at the main brushes.

6. In combination with a generator of the type having a main field winding and an armature with main and auxiliary brushes positioned along the axis of the main field winding and along an axis ninety electrical degrees therefrom, a resistor, an auxiliary field winding disposed with its axis substantially along the axis of the main field winding, and circuit means including a switch operable to connect different portions of the resistor in circuit with the auxiliary brushes to produce volt ampere characteristic curves of lower current values, said switch being effective to connect the auxiliary field winding in circuit with the auxiliary brushes and said different portions of the resistor to shift a portion of the volt ampere curves and increase the open circuit voltage.

JOHN H. BLANKENBUEHLER.

REFERENCES CITED

The following references are of record in the file of this patent:

UNITED STATES PATENTS

| Number | Name | Date |
|---|---|---|
| 458,618 | Clark | Sept. 1, 1891 |
| 2,227,678 | Stiles | June 7, 1941 |
| 2,394,049 | Fisher | Feb. 5, 1946 |